Dec. 13, 1966 S. L. PASTOR ETAL 3,291,323

TAPE CARTRIDGE CHANGER MECHANISM

Original Filed May 8, 1961 5 Sheets-Sheet 1

INVENTORS
S. LEE PASTOR
MYRON ZARR
BY
Carpenter Abbott Coulter & Kinney
ATTORNEYS

TAPE CARTRIDGE CHANGER MECHANISM

Original Filed May 8, 1961 5 Sheets-Sheet 2

INVENTORS
S. LEE PASTOR
MYRON ZARR
BY
Carpenter Abbott Coulter & Kinney
ATTORNEYS

TAPE CARTRIDGE CHANGER MECHANISM

Original Filed May 8, 1961 5 Sheets-Sheet 3

INVENTORS
S. LEE PASTOR
MYRON ZARR

BY

Carpenter, Abbott, Coulter and Kinney

ATTORNEYS

TAPE CARTRIDGE CHANGER MECHANISM

Original Filed May 8, 1961 5 Sheets-Sheet 4

INVENTORS
S. LEE PASTOR
MYRON ZARR
BY
Carpenter Abbott Coulter and Kinney
ATTORNEYS Dec. 13, 1966 S. L. PASTOR ETAL 3,291,323

TAPE CARTRIDGE CHANGER MECHANISM

Original Filed May 8, 1961 5 Sheets-Sheet 5

INVENTORS
S. LEE PASTOR
MYRON ZARR

BY

Carpenter, Abbott, Coulter & Kinney

United States Patent Office 3,291,323
Patented Dec. 13, 1966

3,291,323
TAPE CARTRIDGE CHANGER MECHANISM

Sheldon Lee Pastor, St. Paul, Minn., and Myron Zarr, Chicago, Ill., assignors to Minnesota Mining and Manufacturing Company, St. Paul, Minn., a corporation of Delaware Original application May 8, 1961, Ser. No. 108,352, now Patent No. 3,149,797, dated Sept. 22, 1964. Divided and this application July 13, 1964, Ser. No. 382,321
6 Claims. (Cl. 214—6)

This invention relates to improvements in self-threading magnetic tape recording and reproducing apparatus, and more particularly relates to a cartridge storage and changer mechanism.

This application is a division of application Serial No. 108,352, filed May 8, 1961, now Patent No. 3,149,797, for Self-Threading Magnetic Tape Recording and Reproducing Apparatus.

Previously known changer mechanisms for use with recording and reproducing apparatus have had many disadvantages. In the prior devices, once the cartridges are placed in the recording apparatus their order cannot be changed during the operation of the machine. Also, the number of cartridges which could be placed in the prior known changer mechanisms was limited, or alternatively the size of the machine increased as the storage capacity of the changer mechanism was increased.

The present invention provides a novel and efficient storing and changer mechanism which is adapted for use with an automated self-threading magnetic tape recorder-reproducer and which lends compactness to such a recorder-reproducer. In the illustrated embodiment the novel cartridge storage and changer mechanism includes means for moving a cartridge from a stored position to a referenced position and the apparatus includes automated means for performing a predetermined cycle of operations with a cartridge in said referenced position, e.g., "threading," "playing" and "rewinding" the tape stored in the cartridge. The cartridge is then indexed to another stored position.

Additionally, the present invention provides a cartridge storing and changer mechanism which handles the cartridges gently and with complete control thereof at all times, and which permits rearrangement or replacement at any time of any cartridge disposed therein, except the cartridge being played at the time.

While the invention concept has particular utility in the field of magnetic recording, the broader aspects of this invention are not so limited, it being obvious that various features hereof have substantial utility in other fields.

Other novel features and advantages of the present invention other than those aforesaid will become apparent as the description proceeds, reference being had to the drawing accompanying and forming a part of this specification, wherein.

Figure 1:
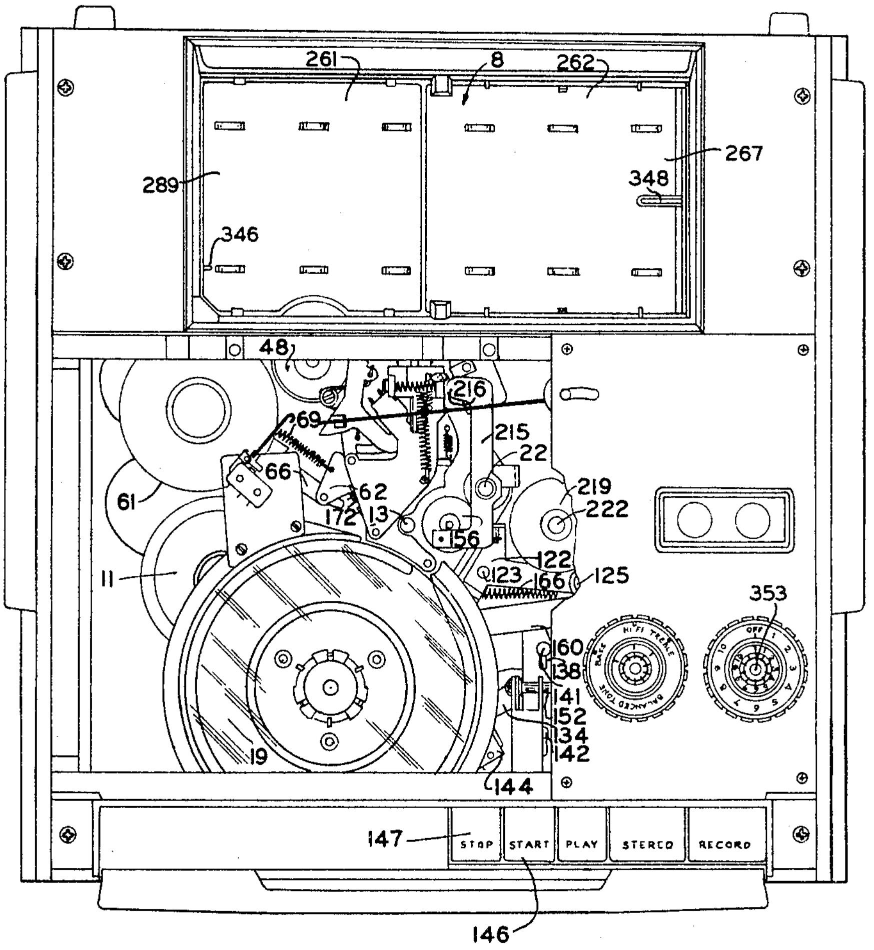
FIGURE 1 is a plan view of a magnetic tape recorder-reproducer with one cover plate section removed to expose the parts therebelow and incorporating the storage and changer mechanism.
Figure 4:
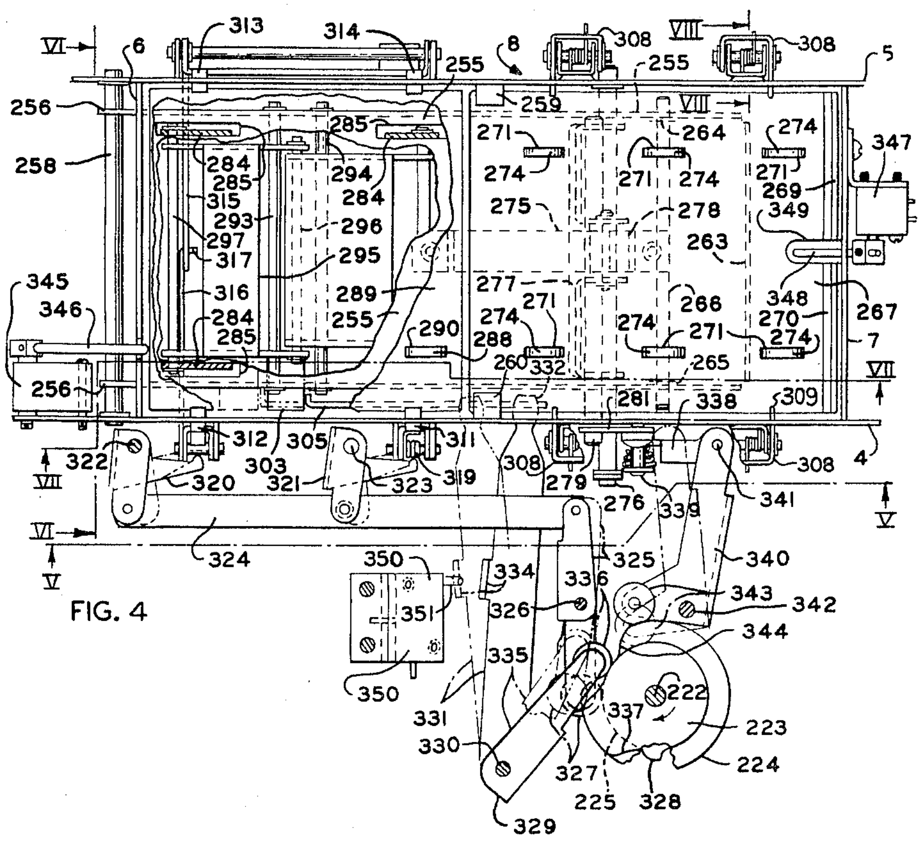
FIGURE 4 is a fragmentary sectional plan view of the cartridge storing and changing mechanism taken generally along the line IV—IV of FIGURE 6, parts being broken away.
Figure 5:
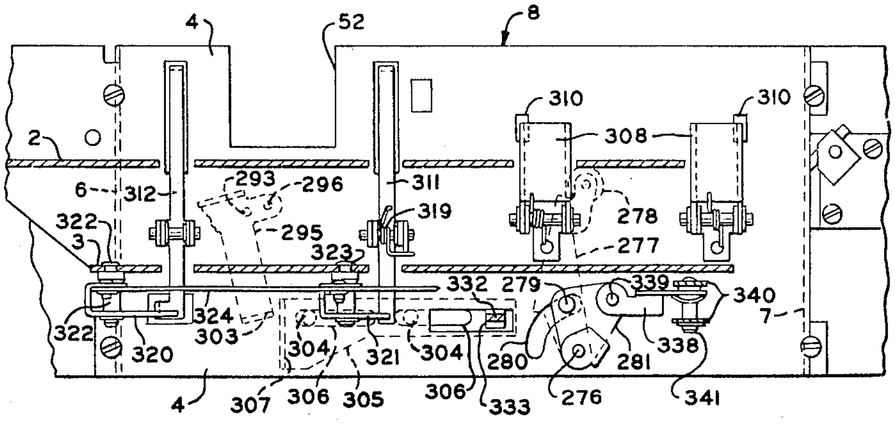
FIGURE 5 is a fragmentary vertical sectional view taken generally along the line V—V of FIGURE 4.

Referring more particularly to FIGURE 1 of the drawing, it will be observed that the recorder-reproducer comprises a generally rectangular box-like case which removably encloses a chassis on which the component parts of the invention are mounted. The chassis comprises an upper deck 2 and a lower deck 3 spaced therefrom as shown in FIGURE 5. As shown in FIGURE 4, the chassis includes at the rear thereof spaced parallel vertical plate or wall members 4 and 5 joined by spaced parallel vertical wall members 6 and 7 to provide a rectangular well forming part of a cartridge storage and changer mechanism indicated generally by the numeral 8.

Figure 7:
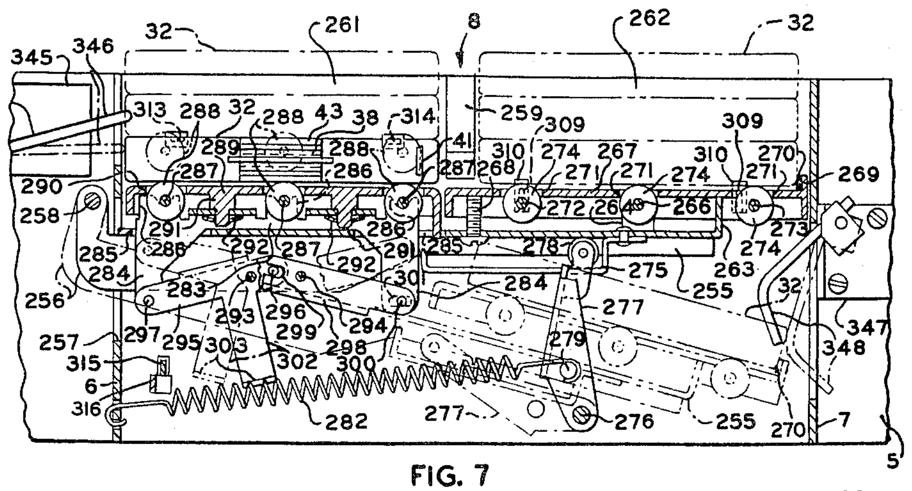
FIGURE 7 is a vertical sectional view taken generally along the line VII—VII of FIGURE 4.
Figures 6, 8, 9, 10, 11, 12:
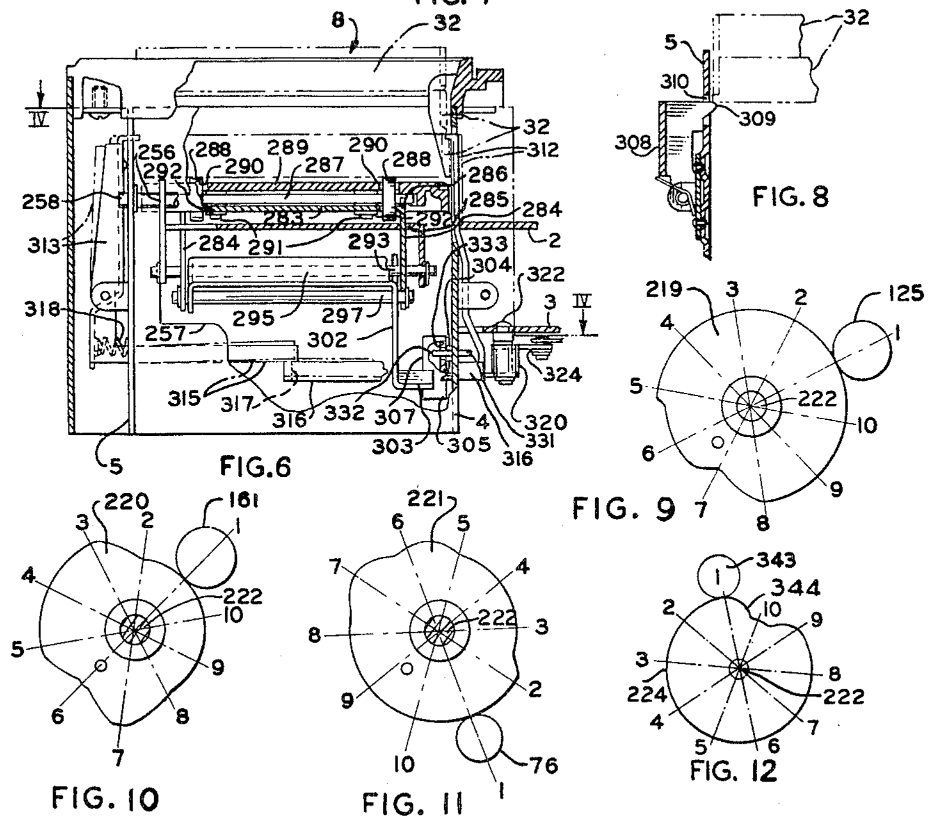
FIGURE 6 is a fragmentary vertical sectional view taken generally along the line VI—VI of FIGURE 4, parts being broken away.
FIGURE 8 is a fragmentary vertical sectional view taken along the line VIII—VIII of FIGURE 4.
FIGURES 9 to 14 are plan views illustrating certain cam profiles.
Figure 15:
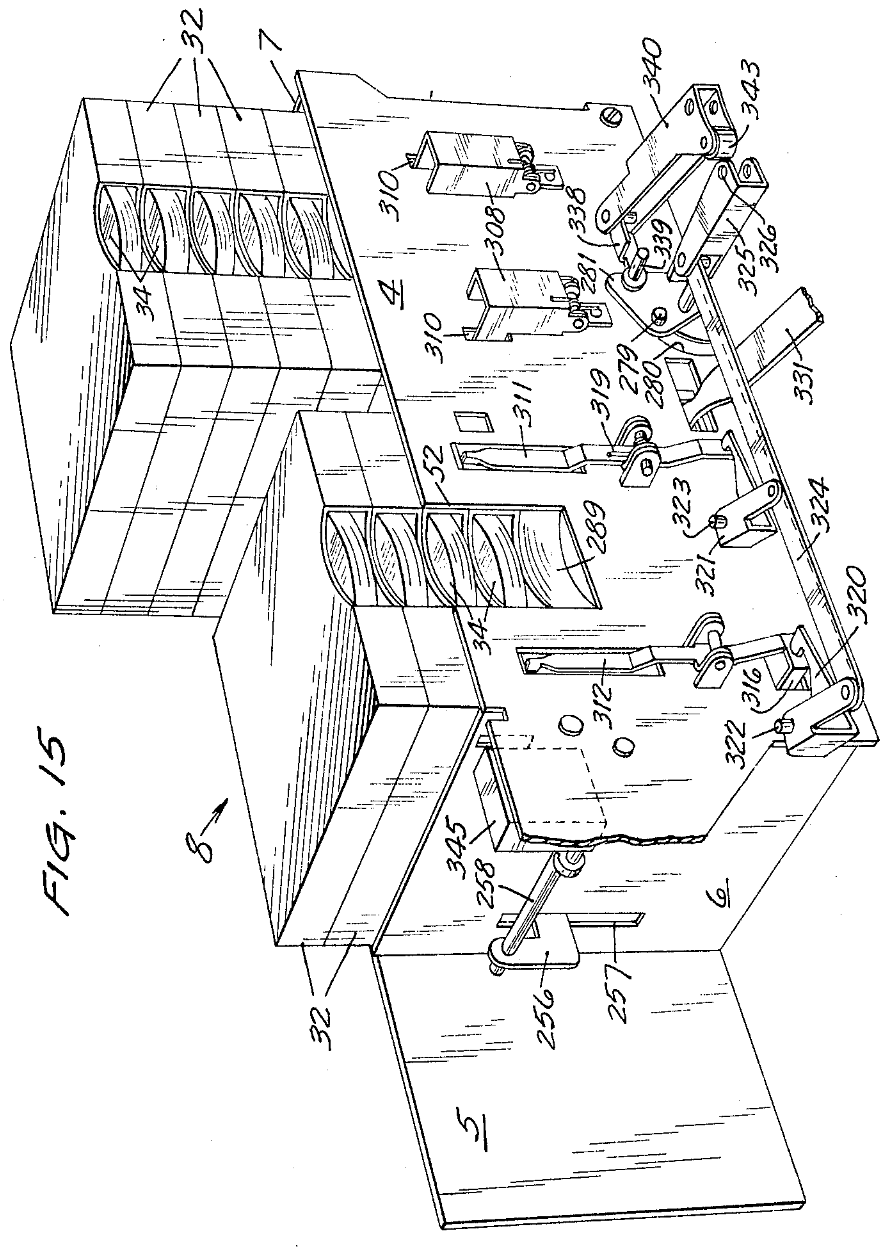
FIGURE 15 is a perspective view of the storage and changer mechanism, showing cartridges stacked in superimposed position in each magazine thereof.

The changer mechanism 8 is adapted to accommodate a cartridge 32 (FIGURES 6 and 7) in "play" position therein, as well as a plurality of similar cartridges stacked thereabove as shown in dot and dash lines in FIGURES 6 and 7 and in solid lines in FIGURE 15. The cartridge 32 comprises a shallow rectangular container within which a supply reel 34 (see FIGURES 2 and 15) is rotatably mounted upon which the recording tape is wound. When the cartridge 32 is moved to the "play" position the recorder-reproducer apparatus operates through a predetermined cycle to play or record a signal on the tape. When in the "play" position, the supply reel 34 in the cartridge 32 is disposed in the same horizontal plane as the takeup reel 19, shown in FIGURE 1.

Figure 2:
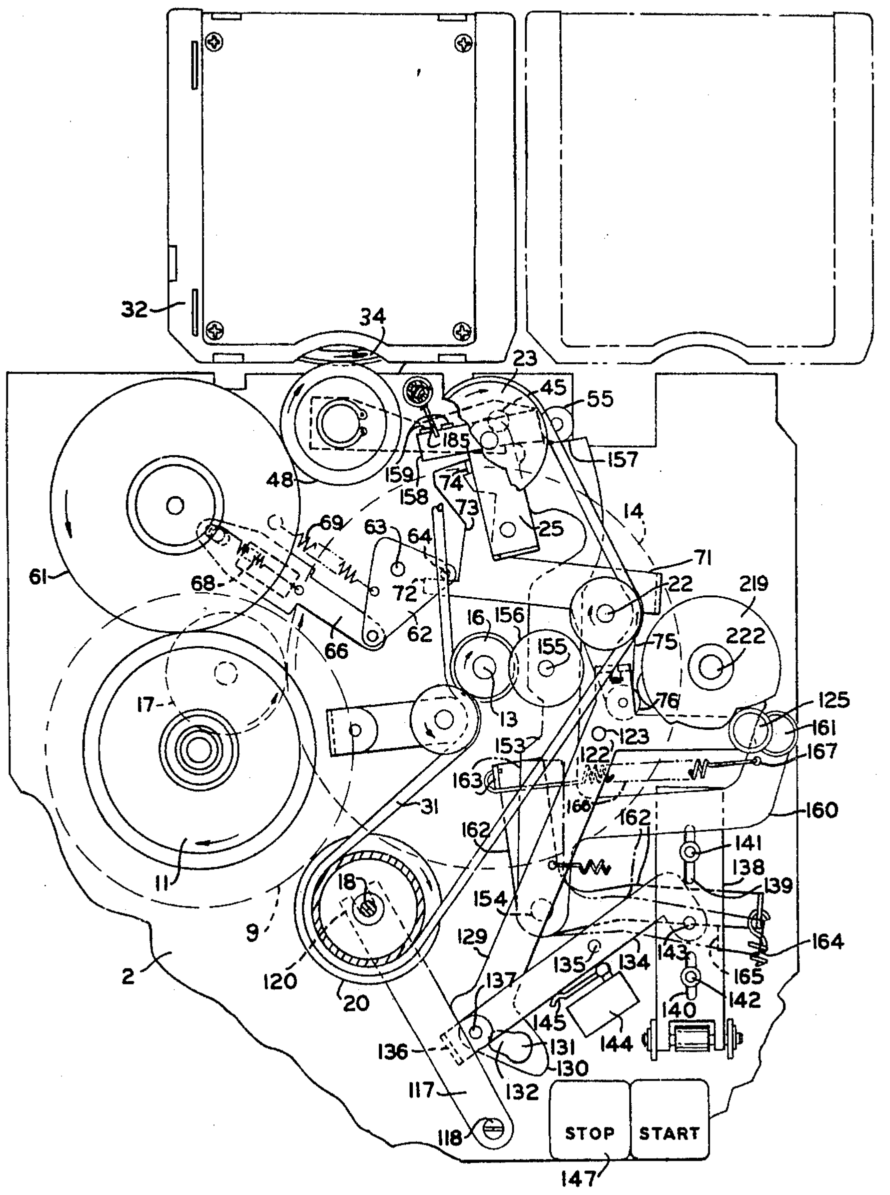
FIGURE 2 is a fragmentary plan view showing the parts in "rewind" position.

Means is provided for driving the tape out of the cartridge 32 and threading it through the machine to the takeup reel 19. This means comprises a rotatably mounted drive-out-rewind roller 48 movable into and out of engagement with the periphery of the reel 34. Means is provided for effecting engagement of the forward drive for the drive-out-rewind roller 48, disengagement of all drive for said roller or, as shown in FIGURE 2, engagement of the rewind drive for said roller. Power for the operation of the apparatus is derived from a motor 9 having an upstanding drive shaft 10 which projects through deck 2 and carries a drive wheel 11. A capstan shaft 13 also is supported in deck 2 and carries a flywheel 14 therebelow which is driven through an idler 17 from the drive shaft 10. A pulley 16, carried by the capstan shaft 13 above the deck 2, drives an endless belt 31 which affords rotation of the takeup reel 19, through a clutch mechanism associated with a shaft 18, and the forward drive for the drive-out-rewind roller 48, as will hereinafter appear.

The drive for the roller 48 is controlled by an irregularly shaped stamping 71 which is mounted above the deck 2 for pivotal movement about the axis of a pulley shaft 22. The stamping 71 has a projection 72 for coaction with a depending pin 64 on a plate 62 pivoted about pin 63, and it also has a laterally projecting arm 73 formed with an upstanding lug 74 (FIGURE 2) for coaction with an arm 25 which supports a belt pulley 23. The stamping 71 has three operative positions, in the intermediate position the upstanding lug 74 engages the arm 25 to hold the belt 31 out of driving engagement with the roller 48. At the same time, the bias of the spring 69 holds a rewind idler 61 out of engagement with the drive-out-rewind roller 48 through a plate 62 and link 66. In the forward, "drive-out" or "thread" position of the member 71 the upstanding lug 74 has been withdrawn from the arm 25 sufficiently to permit engagement of the belt 31 with the drive-out-rewind roller 48 for counterclockwise rotation of the latter. At the same time, the action of the spring 69 holds the rewind idler 61 out of engagement with the rollers 11 and 48.

The "rewind" position of the member 71 is shown in FIGURE 2. In this position the upstanding lug 74 engages the arm 25 and holds the latter in a position wherein the belt 31 is spaced substantially from the drive-out-rewind roller 48. At the same time, the projection 72 has engaged the depending pin 64 on plate 62 and rotated said plate counterclockwise against the bias of the spring 69, such movement being effective through the link 66 and spring 68 to pull the rewind idler 61 into driving engagement with both the drive roller 11 and the drive-out-rewind roller 48 to thereby cause clockwise rotation of the latter as shown by the arrows. The stamping 71 is formed with a laterally projecting arm 75 which carries a cam following roller 76 through which the disposition of the stamping 71 is controlled as will hereinafter appear.

The clutch mechanism provided between the drive mechanism and the takeup reel 19, is driven by the pulley 20 and, as shown most clearly in FIGURE 2, the clutch is actuated by a lever 117 which has one end apertured to receive a screw 118 threaded into the deck 2, there being a helical spring (not shown) surrounding the screw 118 and holding the adjacent end of the lever 117 elevated against the head of said screw and spaced above the deck 2. The other end of the lever 117 is bifurcated as at 120, said bifurcated end embracing the shaft 18 and engaging the floating pulley 20. Means is provided for actuating the clutch lever 117, and to this end a three-armed lever 122, pivoted on a pin 123, is provided which on one arm thereof carries a cam following roller 125 and has an enlarged end portion 130 on the arm 129 thereof.

A generally L-shaped lever 134 is pivotally mounted on a vertical pin 135 and terminates at one end in a rounded, upturned flange 136 which engages the underside of the clutch actuating lever 117. An enlarged end portion 130 of an arm 129 of the lever 122 is disposed adjacent a downwardly offset circular portion 137 formed on the lever 134 which is adapted to engage the upper surface of the lever end portion 130 as well as the upper surfaces of upwardly offset portions 132 and 131 of the arm 129, to provide, when engaged with said surfaces respectively, the "off," the "low torque" and the "high torque" positions of the lever 117 and clutch drive pulley 20.

The other end of the lever 134 is pivotally connected, as by pin 143, to a slide bar 138 which is slotted as at 139 and 140 to receive fixed guide pins 141 and 142. A normally open switch 144 has an arm 145 positioned adjacent the lever 134.

Referring to FIGURE 2, an irregularly shaped arm 153 is pivotally mounted at one end on a fixed pin 154, and intermediate its length said arm carries an upstanding stub shaft 155 on which a pressure roller 156 of rubber-like material is freely rotatable, said roller being cooperable with the capstan 13. The arm 153 has an end surface 157 cooperable with the roller 55 and said arm has a laterally projecting end portion 158 formed at one edge with a pair of spaced upstanding lugs 159. The arm 153 is also formed with an L-shaped branch arm 160 which carries a cam following roller 161 at its outer end for controlling the position of said arm during the automatic cycling of the apparatus. The arm 153 has two operative positions between which it can be moved on the pivot 154, i.e. the advanced position thereof wherein the pressure roller 156 is in engagement with the capstan 13, and the retracted position thereof shown in FIGURE 2. It will be observed that when the arm 153 is in its retracted position, the drive-out and rewind roller 48 is advanced into position for engagement with a leader wound on the periphery of the reel in the cartridge 32 during the threading portion of the cycle or with the peripheral edges of the reel flanges as shown in FIGURE 2 during the rewind portion of the cycle.

An L-shaped crank member 162 is also pivoted on the pin 154 and is formed at the end of one arm thereof with an upstanding lug 163 positioned for engagement with the adjacent edge of the arm 153. A tension spring 164 is connected at one end to the end of the other arm of crank 162, and the other end of said spring is suitably anchored such that said spring biases the crank 162 in a clockwise direction. The slide bar 138 is formed with a downturned lug 165 shown in dotted lines in FIGURE 2, and the spring 164 biases the adjacent arm of the crank 162 into engagement with the lug 165 such that the crank 162 follows the movement of the slide bar 138. Thus, upon retractile movement of the slide bar 138 in response to depression of a stop key 147 the crank 162 pivots to the dot and dash line position thereof shown in FIGURE 2, and if the arm 153 is in advanced position at the time, the lug 163 on said crank arm engages the arm 153 and moves the same to its retracted position shown in FIGURE 2. A tension spring 166 is connected at one end to the upstanding lug 163 on crank 162 and has its other end connected to the branch arm 160 of the arm 153, as at 167. The spring 166 is under continuous tension at all times.

Movement of the lever 122, and of the arm 153 and lever 71 is under the control of cams 219, 220 and 221 which are fixed on a vertical cam shaft 222 and coact respectively with the cam following rollers 125, 161 and 76. The cam shaft 222 is mounted in suitable bearings in the decks 2 and 3, and as shown in FIGURE 4, cams 223, 224 and 225 are fixed on the lower end of the said cam shaft and below the deck 3 for controlling the operation of the changer mechanism 8 as will hereinafter appear.

Referring to FIGURE 9, it will be observed that the cam 219 affords three positions of the follower 125 and therefore of the lever 122. The innermost position of the follower 125 effects disposition of the lever 122 in the "rewind" position thereof shown in FIGURE 2.

Referring to FIGURE 10, it will be observed that the cam 220 affords two positions for the cam following roller 161 and thereby of the arm 153 carrying pressure roller 156. The outermost position of the follower 161 effects disposition of the arm 153 in the retracted position thereof shown in FIGURE 2.

Referring to FIGURE 11, it will be observed that the cam 221 affords three positions for the cam following roller 76 and therefore of the lever 71. When the follower 76 is in its outermost position, the lever 71 is disposed in the "rewind" position thereof shown in FIGURE 2. When the roller 76 is in its innermost position the lever 71 is disposed in the "drive-out" or "thread" position.

Suitable means is provided for effecting clockwise rotation of the cam shaft 222 in increments of 36 degrees, which increments are numbered from 1 to 10 in FIGURES 9 to 14, which is more fully disclosed in the parent application Serial No. 108,352.

Referring now to FIGURES 4 to 8, and 15 the cartridge storage and changer mechanism will now be described. The walls 4 and 5 are provided on their inner surfaces with vertical rib or guide members 259 and 260 (FIGURES 4 and 7) which divide the chamber or well formed by walls 4 to 7 into two side-by-side open bottomed compartments or magazines for the accommodation of cartridges 32. The magazines may be designated as a load magazine 261 and a storage magazine 262 as shown in FIGURE 7. Disposed within the well formed by the walls 4 to 7 is a rectangular frame member 255 generally channel-shaped cross section having a pair of L-shaped ears 256 projecting from one end through a suitable opening 257 in the wall 6. The walls 4 and 5 support a horizontal shaft 258 to which the ears 256 are connected to afford a pivotal mounting for the frame 255. The frame member 255 has an upturned end flange 263 and is also formed with a pair of upstanding lugs 264 and 265 which support a cross shaft 266. A rectangular table member 267 having downturned side flanges is disposed upon the upturned flange 263 and is engaged by a screw 268 threaded through the frame member 255. The cross shaft 266 extends through the side flanges of the table member 267 to thereby afford a connection between said table member and the frame 255.

The table member 267 is formed adjacent the wall 7 with an upstanding flange 269 having a cushion strip 270, for example of foamed plastic, cemented to the inner surface thereof. The table member 267 is formed with a plurality, for example six, rectangular openings 271, and the side flanges of the table member 267 support cross shafts 272 and 273 which, together with the shafts 266 each support two freely rotatable rollers 274 which may be of nylon or other suitable material. Each of the rollers 274 projects partially through an opening 271 and above the surface of the table member 267 into the tangency with a common plane substantially parallel with the upper surface of said table as shown most clearly in FIGURE 7.

Fixed to the underside of the frame 255 is a generally U-shaped strap member 275. A horizontal shaft 276 is supported at its opposite ends by the walls 4 and 5 and affords a pivotal mounting for one end of the channel-shaped member 277 which carries a roller 278 at its outer end, said roller being disposed between the strap 275 and the underside of the frame 255 as shown in FIGURE 7. The member 277 carries a transverse pin 279 which extends through an arcuate slot 280 formed in the wall 4 and is connected to a triangular plate 281 (FIGURE 5) fixed to the shaft 276 externally of the wall 4. A spring 282 has one end connected to the pin 279 and has its other end suitably anchored to the wall 6 as shown in FIGURE 7, said spring being operative to bias the member 277 in a counterclockwise direction toward the dot and dash line position thereof. Movement of the member 277 from the solid line position to the dot and dash line position thereof shown in FIGURE 7 permits pivotal movement of the frame 255 and the elements mounted thereon to the inclined dot and dash line position thereof shown in FIGURE 7.

A generally channel-shaped frame member 283 overlies the upper surface of the frame 255 below the magazine 261 and the side flanges thereof terminate at each end in downwardly projecting legs 284 which extend freely through accommodating slots 285 formed in the frame member 255. The frame member 283 is formed along each side with preferably three upstanding lugs 286 having V-shaped upper end portions for accommodation of three cross shafts 87, each of which rotatably supports a pair of rollers 288 which may be identical with the rollers 274. A table member 289 overlies the frame members 283 and is formed with rectangular slots 290 for accommodation of the rollers 288. The table member 289 is provided with depending stepped pins 291 the tip portions of which project through suitable openings in the frame 283 and have friction washers 292 pressed thereon to secure the table 289 to the frame 283.

In the FIGURE 7 the table 289 is in "play" position and the cartridge 32 placed on the rollers 288 thereof is in "play" position within the load magazine 261. Means is provided for elevating the table 289 with respect to the frame 255 and table portion 267 to the "load" position indicated by the dot and dash line positions of the rollers 288 in FIGURE 7. To this end, a pair of parallel horizontal transverse shafts 293 and 294 are supported at their opposite ends by the side flanges of the frame member 255. A generally channel-shaped lever 295 is pivoted on the shaft 293 and carries at one end a cross shaft 296. At the opposite end, the member 295 carries a cross shaft 297 which is pinned at its opposite ends to the adjacent pair of depending legs 284 of the frame 283. A generally channel-shaped lever 298 is pivotally mounted on the transverse shaft 294, and the side flanges thereof are slotted at 299 to receive the cross shaft 296. The opposite end of the member 298 carries a cross shaft 300, the ends of which are accommodated in slots 301 formed in the adjacent depending legs 284 of the frame 283. The member 295 is formed with a depending arm 302 having an outturned ear 303 formed on its lower end.

A slide bar 305 (FIGURE 5) is slidably mounted, adjacent the inner surface of the wall 4 on pins 304 which are accommodated within slots 306. As shown in FIGURES 5 and 6, the slide bar 305 is formed with an inturned flange 307 positioned for engagement with the ear 303 of member 295. By sliding movement of the slide bar 305 to the left as viewed in FIGURE 5 to actuate the ear 303 of member 295 from the solid line to the dot and dash line position thereof shown in FIGURE 7, the members 295 and 298 are pivoted about the shafts 293 and 294 in clockwise and counterclockwise directions respectively, and are moved to the dot and dash line positions thereof to simultaneously effect raising of the table 289 to the raised "load" position indicated by the dot and dash line positions of the rollers 288. Upon return movement of the slide bar 305 toward the right, the table 289 and the associated parts return to the "play" position by gravity.

Mounted on the walls 4 and 5 at opposite sides of the storage magazine 262 are spring loaded pawls 308 having inwardly projecting tip portions 309 which project through accommodating openings 310 in the walls 4 and 5. As best shown in FIGURE 8, the tips 309 have upwardly angled lower surfaces and normally horizontal upper surfaces such that movement of a cartridge 32 upwardly therepast within the storage magazine 262 forces the pawls 308 outwardly, said pawls returning inwardly when cleared by the cartridge and preventing subsequent downward movement of said cartridge therepast. It will be observed in FIGURE 7, that the tips 309 of the pawls 308 are disposed just below the plane tangent to the rollers 274.

Pivotally mounted on the sidewalls 4 and 5 at opposite sides of the load magazine 261 are elongated detents or pawls 311, 312, 313 and 314 the inturned upper ends of which are accommodated within suitable apertures in said walls. As best shown in FIGURES 6 and 7, the upper surfaces of the inturned ends of the pawls 311 to 314 are disposed in or slightly below the plane of the upper surface of the cartridge 32 disposed in "play" position in the load magazine 261. The pawls 313 and 314 may be formed from a single stamping which has an inwardly extending bar 315 projecting through a suitable aperture in the wall 5. The pawl 312 is formed with a similar bar 316 having a transversely bent end portion 317 underlying the inner end of the bar 315. A compression spring 318 is interposed between the lower end of the pawl 313 and biases the upper ends of the pawls 313 and 314 inwardly to the position thereof shown in FIGURE 4 and in solid lines in FIGURE 6. The spring 318 acting through the bars 315 and 316 also biases the pawl 312 inwardly to the position thereof shown in FIGURE 4 and in solid lines in FIGURE 6. A spring 319 biases the pawl 311 inwardly to the position thereof shown in FIGURE 4. A pair of crank members 320 and 321 are pivotally mounted in pins 322 and 323 depending from the deck 3, said crank members having arms positioned for engagement with the lower ends of the pawls 312 and 311 respectively, and having other arms pinned to a bar 324 as shown in FIGURES 4 and 5. Movement of the bar 324 toward the right to cause pivoting of the cranks 320 and 321 counterclockwise to the dot and dash line positions thereof shown in FIGURE 4, effects retractile movement of the inturned tips of all of the pawls 311 to 314 from the interior of the load magazine 261 against the bias of the springs 318 and 319. FIGURE 6 illustrates in dot and dash lines the retracted positions of the pawls 312 and 313. When the pawls are thus retracted, a cartridge 32 can freely move therepast within the load magazine 261.

Figures 13, 14:
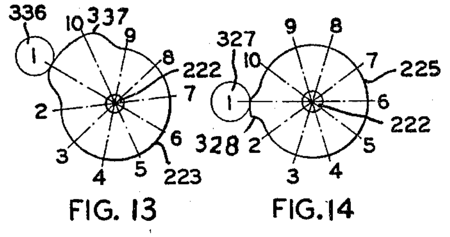

Means is provided for actuating the bar 324 to effect actuation of the pawls 311 to 314, said means comprising a lever 325 pivoted on a pin 326 depending from the deck 3. The lever 325 is pivoted at one end to the adjacent end of the bar 324, and at its other end carries a cam following roller 327 cooperable with the cam 225 fixed on the cam shaft 222 below the deck 3. As shown in FIGURES 4 and 14, the cam 225 is essentially circular and has a raised portion 328. The contour of the cam 225 is such that the lever 325, bar 324 and pawls 311 to 314 are positioned so that the tips of the pawls are projected into the load magazine 261 at all times except when the portion 328 of the cam 225 engages the follower 327 and moves the same to the dot and dash line position thereof shown in FIGURE 4. The bias of the springs 318 and 319 acting through the linkage described maintains the follower 327 in engagement with the periphery of the cam 225.

Raising and lowering of the table 289 with respect to the table 267 and frame 255 is effected by means of a crank 329 pivoted on a pin 330 which depends from the deck 3. The crank 329 has an arm 331 having a tip portion 332 of reduced width which extends through a suitable opening in the wall 4 and into an opening 333 in the slide bar 305 as best shown in FIGURES 5 and 6. The arm 331 is also formed with an upstanding flange 334 at one edge thereof intermediate its length. Crank 329 also has an arm 335 which carries a cam following roller 336 which is cooperable with the cam 223 on the cam shaft 222. As shown in FIGURES 4 and 13, the cam 223 is basically circular and has a raised peripheral portion 337. The weight of the table 289, frame 283 and of the associated linkage, acting through the slide bar 305 and crank 329 maintains the roller 336 in contact with the periphery of the cam 223. Engagement of the raised portion 337 of cam 223 by roller 336 pivots the crank 329 to the dot and dash line position thereof shown in FIGURE 4 with resultant raising of the table 289 to the "load" position thereof indicated by the dot and dash line position of the rollers 288 in FIGURE 7. At all times except when the portion 337 of cam 223 engages roller 336, the table 289 is disposed substantially flush with the table 267 so that together they form a single platform and all of the rollers 274 and 288 are substantially tangent to the same plane.

Movement of the frame 255 and the associated tables 267 and 289 therewith to and from the inclined dot and dash line position shown in FIGURE 7 is under the control of a linkage including a link 338 pinned as at 339 to the triangular plate 281 and also pinned to one arm of a crank 340 as at 341. The crank 340 is pivoted on a pin 342 depending from the deck 3, and the other arm of said crank carries a cam following roller 343 cooperable with the cam 224 on the cam shaft 222. As shown in FIGURES 4 and 12, the cam 224 is basically circular and has a cut-away peripheral portion 344. The bias of the spring 282 acting through the arm 277, shaft 276, plate 281, link 338 and crank 339 maintains the roller 343 in contact with the periphery of the cam 224. At all times except when the cutaway portion 344 is presented to the cam follower 343, the frame 255 and tables 267 and 289 are in the horizontal position. Rotation of the cam 224 sufficient to present the cutaway portion 344 to the follower 343 permits the bias of the spring 282 to move the arm 277, frame 255 and tables 267 and

289 to the inclined dot and dash line positions thereof shown in FIGURE 7.

Mounted on the wall 4 is a normally open switch 345 having a sensing arm 346 which extends through a suitable opening in the wall 6 and is positioned for engagement by a cartridge 32 disposed in "load" position, said arm being swingable downwardly by placement of a cartridge on the rollers 288 when the latter are in raised "load" position, and such downward movement of the arm 346 being effective to close the contacts of said switch. The switch arm 346 is retained in the down position so long as there is a cartridge 32 in either "load" or "play" position in the magazine 261. The switch 345 has embodied therein biasing means returning the arm 346 to its raised open contact position when said arm is not engaged by a cartridge in the magazine 261.

A normally open switch 347 is mounted on the wall 7 and is provided with a swingable switch arm 348 which extends through a suitable opening in the wall 7 into the storage magazine 262. As shown in FIGURE 4, the table 267 is formed with a slot 349 for free accommodation of the switch arm 348 without actuation thereof by the table and frame mechanism when the latter is moved to and from its inclined dot and dash line position shown in FIGURE 7.

Suitably mounted on the underside of the deck 3 is a normally open switch 350 (FIGURE 4) having a plunger 351 biased outwardly to the position thereof shown in said figure. The plunger 351 is positioned for actuation by the flange 334 of the crank 329 such that movement of said crank to the dot and dash line position of FIGURE 4 caused the flange 334 to depress the plunger 351 to and thereby close the contacts of switch 350.

Figure 3:
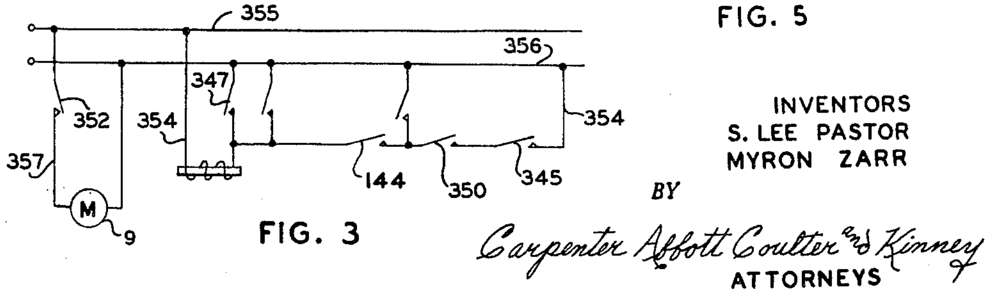
FIGURE 3 is a schematic diagram of the electrical circuit for controlling the operation of the cartridge storage and changer.

Referring to FIGURE 3, it will be observed that the electrical circuit for the improved recorder-reproducer comprises a conductor 354 connected at one end to a line conductor 355 and its other end to a line conductor 356. Interposed in the conductor 354 are a solenoid and switches 144, 350 and 345 in series circuit relation. The switch 347 has one terminal thereof connected to the line conductor 356 and the other terminal thereof connected to the conductor 354 between the solenoid and switch 144. A conductor 357 has one end connected to the line conductor 355 and has its other end connected to the line conductor 356, the conductor 357 having the motor 9 and an off-on switch 352 interposed therein in series circuit relation. The switch 352 may be provided with a knob 353 which projects from the top of the case 1 as shown in FIGURE 1.

*Operation*

At the beginning of a cycle, the "start" key 146 is up, and the parts of the apparatus are in "load" position, the cams 219 to 224 being positioned with respect to their respective followers as shown in FIGURES 9 to 14. The frame 255 and table 267 are in horizontal position, and the pawls 311 to 314 are retracted from the load magazine 261. The table 289 is in raised "load" position, and the switch 350 is actuated to closed position by engagement of the flange 334 with the plunger 351. All of the switches except the switch 350 are open, and the motor switch is closed to start the motor 9 at the will of an operator by manual actuation of the knob 353. The drive-out-rewind roller 48 is in the advanced position and is not rotating. The pressure roller 156 is out of contact with the capstain 13. The clutch pulley 20 is in its lowermost disengaged position and no torque can be supplied to the take-up reel 19, although the capstan 13 and pulleys 16, 20, 21, 23 and 27 are rotating in the directions indicated in FIGURE 2.

Placement of a cartridge 32 in the load magazine 261 on the rollers 288 causes closure of the switch 345, however, since the switch 144 is open, no current can flow to the solenoid 251.

Upon depression of the start key 146, the slide member 138 is moved inwardly to thereby actuate the lever 134 and also to pivot the crank 162 from the dot and dash line position thereof to the solid line position thereof shown in FIGURE 2. Such movement of the crank 162 moves the upstanding lug 163 out of engagement with the arm 153 to thereby cause retraction of the drive-out-rewind roller 48 and advancement of pressure roller 156 into contact with the capstan 13. The aforementioned pivoting of the lever 134 effects closure of the switch 144 and movement of the portion of the lever 134 over the portion 131 of the arm 129 of member 122 to actuate the clutch pulley 20 to its uppermost or high torque position. This completes the circuit to the solenoid which causes subsequent rotation of the cam shaft 222 36 degrees in a clockwise direction from the position "1" shown in FIGURES 9 to 14 to the position "2" indicated therein. Such rotation causes inward movement of the follower 336 (FIGURE 13), to cause controlled and gentle lowering of the table 289 with the cartridges 32 thereon to the "play" position shown in FIGURE 7, opening the switch 350 and thereby deenergizing the solenoid. After lowering of the table 289 has been initiated, the follower 327 (FIGURE 14) moves inwardly to effect advancement of the pawls 311 to 314 into the magazine 261. The cam shaft 222 then continues to be rotated another 36 degrees toward position "3" shown in FIGURES 9 to 14.

Movement of the cam shaft 222 to position "3" causes the cam follower 76 (FIGURE 11) to move inwardly toward its innermost position and the cam follower 161 (FIGURE 10) to move outwardly toward its outermost position. This action imparts retractile movement to the arm 153 and pressure roller 156 and advancing movement to the drive-out-rewind roller 48 to the solid line position thereof shown in FIGURE 2 following lowering of the table 289. In this position the drive-out-rewind roller engages the portion of the leader wound on the peripheries of the flanges of the reel 34 in the cartridge 32. By the cam rotation to position "3" the lever 71 is pivoted, permitting the pulley 23 to swing toward the advancing drive-out-rewind roller 48 under the tension of the belt 31, bringing said belt into driving engagement with said roller to cause counterclockwise rotation of the latter.

The roller 48 thereupon pushes the leader in the direction to unwind said leader from the cartridge or supply reel 34, said leader being guided toward the take-up reel 19. The cam shaft 222 continues to be advanced clockwise in increments of 36 degrees through the position "5" shown in FIGURES 9 to 14, allowing time for the leader to enter the take-up reel 19 between the flanges thereof and have its opposite edges frictionally gripped by said flanges as the upper flange is raised thereby against the bias of a compression spring. The take-up reel 19 is rotated at a rate such that the peripheral velocity of the hub member is substantially greater than the velocity at which the leader is moved into said take-up reel. As a result of the novel coaction of the reel 19 and leader, the clockwise rotation of the reel 19 causes the leader to be wound onto the hub member thereof.

Upon rotation of the shaft 222 from position "5" toward position "6" shown in FIGURES 9 to 14, the follower 125 moves to its intermediate position. At the same time, follower 161 moves to its inner position advancing the member 153 and pressure roller 156 to their positions wherein the pressure roller 156 engages the magnetic tape, pressing the same against the capstan 13 and at the same time retracting the drive-out-rewind roller 48.

Further, movement of the cams to position "6" causes the follower 76 to be moved to its intermediate position, pivoting the member 71 wherein the upstanding lug 74 of said member engages the arm 25 to hold the pulley 23 and belt 31 away from the retracted roller 48. The apparatus is now in "play" or "record" position and upon arrival of the cam shaft 222 at position "6," the cam shaft 222 comes to rest.

If, while the parts of the apparatus are in play-record position, the stop key 147 is depressed, the start key 146 and its associated parts are returned to their initial "off" positions. More particularly, the slide bar 138 is retracted and the lever 134 is pivoted to effect opening of the switch 144. This movement of lever 134 also moves the portion 137 of the lever 134 off of the raised portion 132 of the member 122 and onto the upper surface of the end portion 130 of said member to effect lowering of the clutch drive pulley 20 to its lowermost disengaged position. Rotation of the take-up reel 19 thereupon ceases. Retraction of the slide bar 138 has the further effect of pivoting the crank 162 (FIGURE 2) to the dot and dash line position thereof, such movement causing the upstanding lug 163 to engage the arm 153 and cause retraction thereof. Subsequent depression of the start key returns the parts of the "play" positions they occupied prior to depression of the stop key.

The parts of the apparatus remain in the "play" or "record" position until all of the leader and tape have been transported to the take-up reel and a trailer connected between the end of the tape and the hub of the reel 34 is partially wound onto the take-upreel. When no more trailer is available for withdrawal from the cartridge or supply reel 34, the pull exerted on the trailer by the coaction of the pressure roller 156 and capstan 13 exerts substantially increased tension on the portion of the trailer extending between the capstan and the hub of the reel 34 to which the trailer 39 is fixed. This tension effects actuation of the solenoid causing the cam shaft 222 to be advanced another 36 degrees toward position "7" of FIGURES 9 to 14 and to stop thereat.

This movement of the cams moves the follower 125 to its innermost position to thereby move the member 122 to the "rewind" position position thereof shown in FIGURE 2 wherein the portion 137 of lever 134 is moved out of engagement with the raised surface portions 131 and 132 of the lever 122 to thereby disengage the clutch on the take-up reel.

Movement of the cam 220 to position "7" causes movement of the follower 161 to its outer position to cause retractile movement of the arm 153 and pressure roller 156 and simultaneously advancement of the drive-out-rewind roller 48 into engagement with the peripheries of the flanges of the reel 34.

Rotation of the cam 221 to the position "7," moves the follower 76 to its outermost position to thereby pivot the member 71 clockwise to its "rewind" position shown in FIGURE 2, wherein the projection 72 on the member 71 engages the pin 64 and holds the triangular plate 62 rotated counterclockwise against the bias of spring 69 to the position thereof shown in FIGURE 2. Such positioning of the plate 62, acting through the link 66 and spring 68 pulls the rewind idler 61 into engagement with both the motor drive wheel 11 and the advanced drive-out-rewind roller 48. The roller 48 is rotated clockwise by the idler 61, and by virtue of its engagement with the reel flanges, it rotates the reel 34 counterclockwise to effect high speed rewinding of the trailer, tape and leader onto said reel. Such rewind, of course, causes counterclockwise rotation of the take-up reel 19 which is free to thus rotate, since the clutch thereof is disengaged.

The rewind operation continues until the leader passes sensing members which energizes the solenoid and permits rotation of the cam shaft 222 toward position "8" shown in FIGURES 9 to 14.

During rotation of the cam 219 (FIGURE 9) to position "8"; the follower 125 is moved to its outermost position pivoting the member 122 wherein the portion 131 thereof is moved under the portion 137 of the lever 134 to re-engage the take-up reel clutch in high torque position.

Rotation of the cam 220 (FIGURE 10) to the position "8" returns the follower 161 to its inner position to effect advancing movement of the member 153 and pressure roller 156 and retractile movement of the drive-out-rewind roller 48. Rotation of the cam 221 (FIGURE 11) to position "8" causes movement of the follower 76 to its intermediate position, permitting the member 71 to return to the intermediate position wherein the bias of the spring 69 moves the rewind idler 61 out of engagement with the drive-out-rewind roller 48.

Rotation of the cam shaft 222 continues through position "9," at which point the follower 343 (FIGURE 12) moves inwardly toward its innermost position as the cutout portion 344 of cam 224 is presented thereto. This causes downward tilting of the frame 255, together with platforms 267 and 289 to the dot and dash line position thereof shown in FIGURE 7. The cartridge 32 which was disposed upon the rollers 288 in "play" position in the magazine 261 now moves by gravity on the rollers 288 and 274 along the inclined platform and into engagement with the cushion 270. As the last-mentioned cartridge 32 reaches the end of the incline, it engages the switch arm 348 and moves the same to the dot and dash line closed position shown in FIGURE 7. The remaining cartridges on the load magazine 261 are retained therein by the pawls 311 to 314 at this time.

Rotation of the cam shaft 222 to position "10" also causes the follower 336 (FIGURE 13) to be moved outwardly to close the switch 350 and move the slide bar 305 (FIGURES 4 and 5) toward the left. However, because of the fact that the frame 255 is inclined, said bar has no substantial actuating effect on the arm 302 so that the table 289 remains substantially flush with the table 267.

Upon actuation of the switch 347 by the cartridge 32 reaching the lower end of the incline, the circuit to the solenoid is completed and further rotation of the cam shaft toward position "1" results, thereby causing outward movement of the follower 343 (FIGURE 12) and return of the changer frame 255 together with platform 267 to the horizontal solid line position thereof shown in FIGURE 7. This action lifts the cartridge at the end of the incline upwardly into the storage magazine 262 past the tips 309 of the pawls 308 which thereafter prevent downward movement of said cartridge therepast. It will be observed that the switch 347 preferably serves as an interlock preventing raising of the inclined platform until the played cartridge reaches the lower end of the inclined platform.

During raising of the frame 255 toward the horizontal position, the ear 303 of member 295 engages the slide bar flange 307 to cause actuation of the pivotal members 295 and 298 to the dot and dash line positions thereof shown in FIGURE 7 as the frame 255 reaches its horizontal position. This raises the platform 289 to its "load" position indicated by the dot and dash line positions of the rollers 288 in FIGURE 7, in which position said rollers engage the undersurface of the cartridge 32 resting on the tips of the pawls 311 to 314. Rotation of the cam 225 (FIGURE 14) to position "1" moves the follower 327 outwardly to effect retraction of the pawls 311 to 314 from the magazine 261. Upon arrival of the cam shaft 222 at position "1," the playing and changing cycle is complete, and since the cartridge 32 resting on the rollers 288 at the "load" position maintains the switch 345 actuated, a new cycle of operation is initiated.

The cartridges stacked in the load magazine 261 are all played automatically and in sequence and are sequentially transferred to the storage magazine 262. When the last cartridge in the magazine 261 moves out of engagement with the switch 345, no further cycling takes place because the electrical circuit to the solenoid is incomplete at the switch 345.

Having thus described a storage and changer mechanism particularly suitable for use with a self-threading magnetic tape recording and reproducing apparatus as one specific embodiment of the invention, it should be understood that the illustrated apparatus was selected to facilitate the disclosure of the changer mechanism and is not intended to place unnecessary limitations on the claims or the disclosure or to confine the invention to a particular use, i.e. to confine the use of the changer mechanism of the present invention to magnetic recording tapes since photographic films and other signals, indicia or graphic symbol bearing tapes could also be used with the cartridges. Various structural changes and modifications may be made in the illustrated embodiment of the changer mechanism without departing from the spirit of the invention.

We claim:

1. In combination, means defining first and second open bottomed magazines in side-by-side relation, a platform mounted for movement between a horizontal first position closing the bottom of both magazines and a second position below said magazines wherein it is inclined in the direction of alinement of said magazines and the portion thereof subtending said second magazine is lower than that subtending said first magazine, and actuating means for effecting movement of said platform from said first to said second position to afford a transfer path for travel of a unit from a first position on said platform within said first magazine transversely and downwardly along said inclined platform to a second position on said platform below said second magazine and for effecting subsequent return of said platform to said first position for introduction of a unit thus transferred into the lowermost position in said second magazine.

2. In combination, means defining first and second open bottomed magazines in side-by-side relation, a platform mounted for movement between a horizontal first position closing the bottom of both magazines and a second position below said magazines wherein it is inclined in the direction of alinement of said magazines and the portion thereof subtending said second magazine is lower than that subtending said first magazine, said magazines each being adapted to accommodate a plurality of units in stacked relation therein, actuating means for effecting movement of said platform from said first to said second position to afford a transfer path for travel of the lowermost of a plurality of units stacked in said first magazine on said platform transversely and downwardly along said inclined platform to a position on said platform below said second magazine and for effecting subsequent return of said platform to said first position for introduction of a unit thus transferred into the bottom of said second magazine, releasable means for retaining the remainder of said stacked units within said first magazine during actuation of said platform, and means for retaining within said second magazine in stacked relation units inserted into the bottom thereof.

3. In combination, means defining first and second open bottomed magazines in side-by-side relation, a platform mounted for movement between a horizontal first position closing the bottom of both magazines and a second position wherein it is inclined downwardly in the direction of alinement of said magazines and the portion thereof subtending said second magazine is lower than that subtending said first magazine, said magazines each being adapted to accommodate a plurality of units in stacked relation therein, said platform having a table portion alined with said first magazine and movable from the plane of said platform to and from a raised position with respect thereto, first actuating means for effecting movement of said platform from said first to said second position to afford a transfer path for travel of the lowermost of a plurality of units stacked above said table portion of said platfrom transversely and downwardly along said inclined platform to a position on said platform below said second magazine and for effecting subsequent return of said platform to said first position for introduction of a unit thus transferred into the bottom of said second magazine, releasable means engaging the lowermost of the remaining units in said first magazine for retaining said remaining units within said first magazine during actuation of said platform, means for retaining within said second magazine in stacked relation units inserted into the bottom thereof, second actuating means for moving said table portion, means for releasing said releasable means, and control means operatively related to both said second actuating means and said releasing means for effecting raising movement of said table portion upon return movement of said platform for engagement of said table portion with the lowermost remaining unit in said first magazine, release of said releasable means from said lowermost remaining unit, and lowering of the table to the plane of said platform while said releasable means is released.

4. A changer mechanism for use with cartridges containing a supply of tape wound therein and adapted for use with an apparatus operative automatically through a predetermined cycle of operation when one of said cartridges is positioned in a reference position with respect thereto comprising in combination: means defining a cartridge receiving chamber, platform means mounted within said chamber, movable detent means in said chamber for bracingly engaging a plurality of cartridges arranged in a load stack and for successively indexing the lowermost cartridge in a said load stack from any cartridges remaining in the load stack, said platform means including an independently movable table portion mounted therewith for lowering a cartridge indexed by said detent means to a said reference position, switch means responsive to the movement of a cartridge to a said reference position for initiating a said cycle of operation, means affording movement of said platform means from a generally horizontal position to an inclined position to move a said cartridge from a said reference position laterally to a remote position in response to completion of a said predetermined cycle, means for moving said platform means from said inclined position to a horizontal position to move a cartridge from a said remote position to a lowermost position in a storage stack, and displaceable detent means in said chamber for supporting a said storage stack in side-by-side relation to said load stack.

5. A changer mechanism as described in claim 4 wherein switch means are provided adjacent the lower end of said platform means when the same is in said inclined position for engagement by a cartridge in said remote position, said last mentioned switch means being operable to indicate the movement of a cartridge from a said reference position to a said remote position, and said means for moving said platform means from said inclined position to a horizontal position being operative upon actuation of said last mentioned switch means.

6. A tape cartridge changer mechanism for use with a recording-reproducing apparatus wherein said cartridges contain a supply of tape, said mechanism comprising: means defining first and second open bottomed magazines in side by side relation, releasable detent means in said first magazine for supporting a plurality of tape cartridges in a load stack, a platform mounted for movement between a horizontal first position closing the bottom of both magazines and a second position below said magazines wherein it is inclined in the direction of alignment of said magazines and the portion thereof subtending said second magazine is lower than that subtending said first magazine, displaceable means for supporting a plurality of cartridges in a storage stack in said second magazine, said displaceable means being movable to permit movement of a said cartridge therepast to a lowermost position in a said storage stack, means for retracting said detent means from said first magazine to separate the cartridge in the lowermost position in a said load stack to a reference position on said platform, means affording movement of said platform from said first position to said second position and for effecting subsequent return of said platform to said first position, and cam means operating said retracting means and said means affording movement of said platform in a predetermined sequence whereby a cartridge may be lowered onto said platform to said reference position and subsequently shifted to a position in said second magazine and raised to a position past said displaceable means and into the lowermost position of a said storage stack.

References Cited by the Examiner

UNITED STATES PATENTS

| | | | |
|---|---|---|---|
| 2,598,222 | 5/1952 | Cahners. | |
| 2,744,372 | 5/1956 | Cleaveland | 214—6.2 X |
| 2,749,120 | 6/1956 | Mallory | 214—6.2 X |
| 3,015,303 | 1/1962 | Stohlquist | 214—6.2 X |
| 3,038,615 | 6/1962 | Roth | 214—6.2 X |

GERALD M. FORLENZA, *Primary Examiner.*

MORRIS TEMIN, *Examiner.*